W. E. HARPER.
BOLL WEEVIL EXTERMINATOR.
APPLICATION FILED JAN. 10, 1917.
1,257,343.
Patented Feb. 26, 1918.
3 SHEETS—SHEET 3.
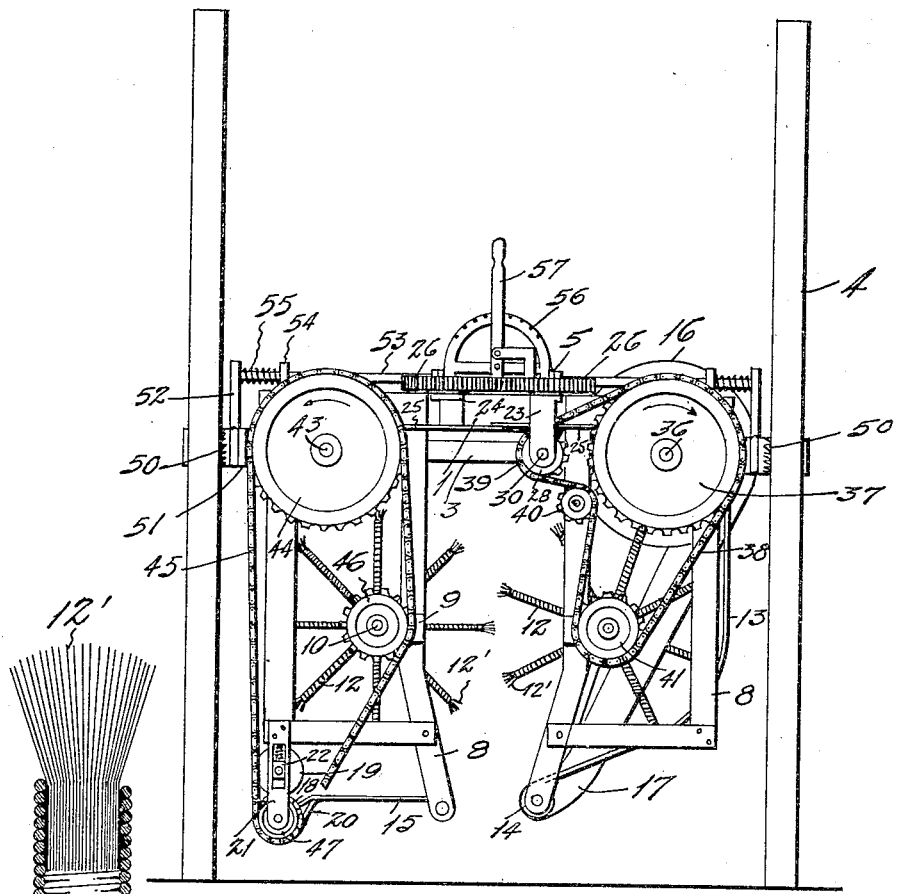
Fig. 3.
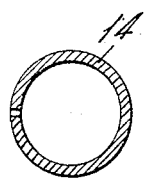
Fig. 4.
Fig. 5.
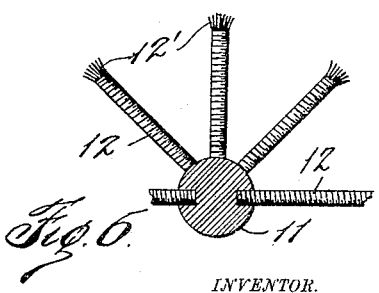
Fig. 6.
INVENTOR.
W. E. HARPER.
BY
Jack H Schley
ATTORNEY.

UNITED STATES PATENT OFFICE.

WILLIAM E. HARPER, OF CENTER CITY, TEXAS.

BOLL-WEEVIL EXTERMINATOR.

1,257,343.   Specification of Letters Patent.   Patented Feb. 26, 1918.

Application filed January 10, 1917. Serial No. 141,520.

*To all whom it may concern:*

Be it known that I, WILLIAM E. HARPER, citizen of the United States, residing at Center City, in the county of Mills and State of Texas, have invented certain new and useful Improvements in Boll-Weevil Exterminators, of which the following is a specification.

It is well known that boll weevils lay their eggs in the unmatured cotton bolls and these drop off the plant and are lost. There is a certain period during the growth of the plant that those bolls in which eggs have been laid may be easily knocked or displaced from the plant without disturbing the maturing or good bolls. If the bad bolls are removed from the plants and destroyed so as to dispose of the eggs, all insects and pests which lay their eggs in cotton bolls or other pods, would be gradually exterminated.

It is the purpose of my invention to remove "dead" bolls, clinging insects, worms and other parasites from growing plants and to do so by means of agitation whereby the pests and dead parts are displaced so as to fall toward the ground; but to deflect the falling matter laterally and cause it to pass between crushing rollers, thus mashing and destroying all eggs and insects deflected to the rollers. In addition it is proposed to "top" the plants where the growth has become "rank" and let the rays of the sun reach the lower portions of the plants. Certain insects are not affected by cold, but succumb to intense heat.

In carrying out the invention a wheel supported frame is provided and equipped with two longitudinal agitating rollers mounted on each side of the center of the frame which straddles the row of plants. These rollers or agitators are revolved so as to dislodge the "dead" squares or bolls and insects. The dislodged matter would fall to the ground, but below the rollers a strong air blast is directed transversely of the rollers and causes the falling matter to be deflected onto a bottom and into the "bite" of a pair of crushing rollers. The rollers mash the bolls and other matter and thus destroy all eggs, young insects and other parasites passing between the same, delivering the crushed matter at one side of the machine and between the rows of plants.
Considerable advantage is had by the particular construction of the agitating rollers, which while in a broad sense are revolving beaters, do not beat the plants or disturb any good bolls or squares. A core or center is provided with radially projecting flexible arms of a resilient nature so as to yield and at the same time oscillate when displaced by contacting with a limb or stalk. These arms have their outer ends equipped with brushes which brush the dead bolls and other parasites from the plants when the arms are set to vibrating. The arms being flexible it is obvious that they will yield and not dislodge any "live" portion of the plants.

It has been found that if cotton plants are permitted to grow too close or too high so as to become "rank", the lower portions of the plants are cut off from the rays of the sun, are retarded in growth, and provide an excellent breeding place for insects. The remedy is to thin out the plants and this may be well done by cutting off the tops, which is called "topping". I propose to mount cutters on the frame of my machine at such a height as to top all plants which have grown too high and in this way expose the lower portions of the plants to the rays of the sun.

The invention will be more readily understood from a perusal of the following specification and by reference to the accompanying drawings, in which an example of the invention is shown and wherein:

Fig. 3 is a rear elevation,

Fig. 4 is a detail of one of the flexible arms,

Fig. 5 is cross-sectional detail of the blast pipe, and

Fig. 6 is an end detail of a portion of one of the agitating rollers.

Figure 1:
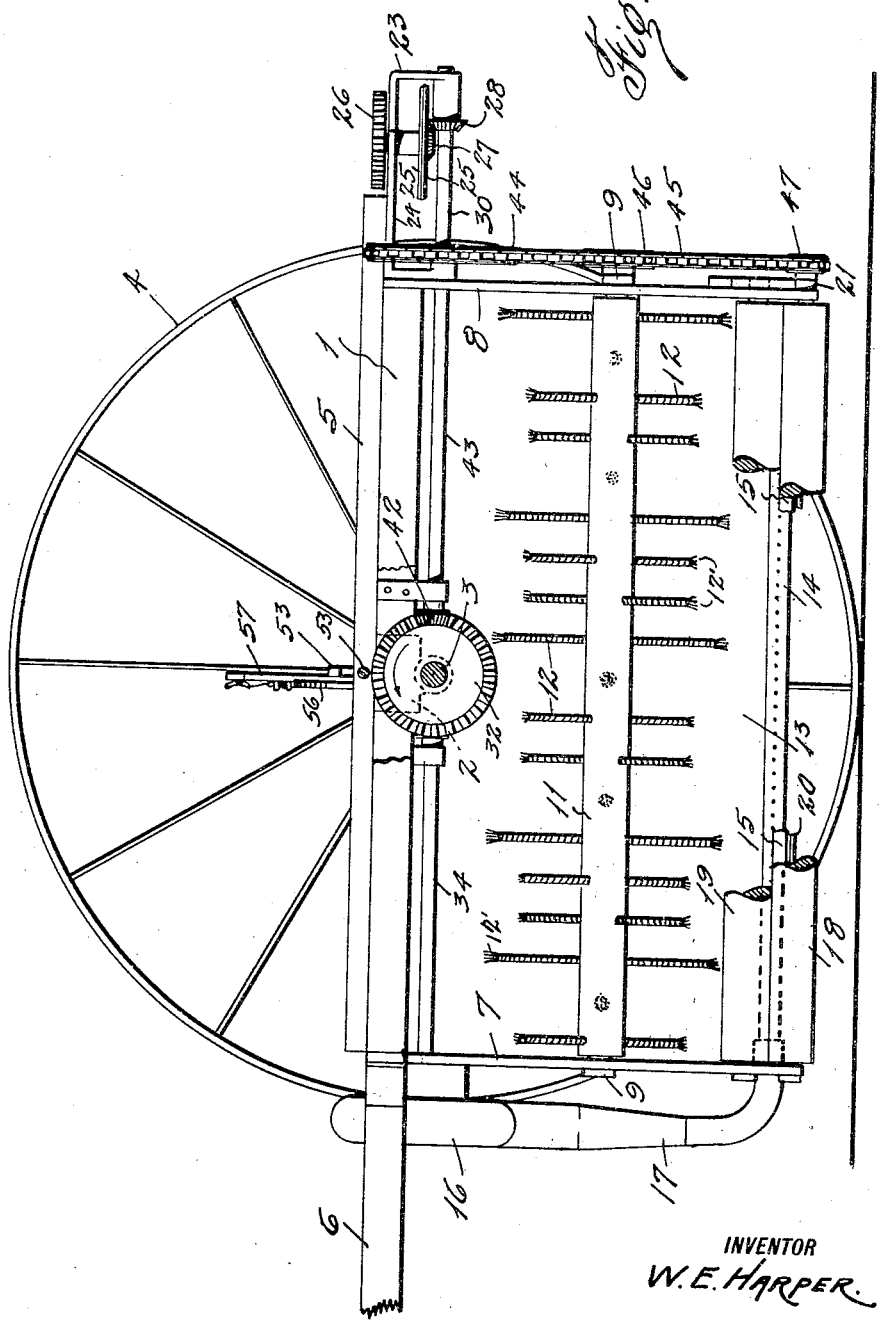
Figure 1 is a side elevation of the machine, the near wheel being omitted and other parts being shown as broken away to illustrate parts in rear thereof.
Figure 2:
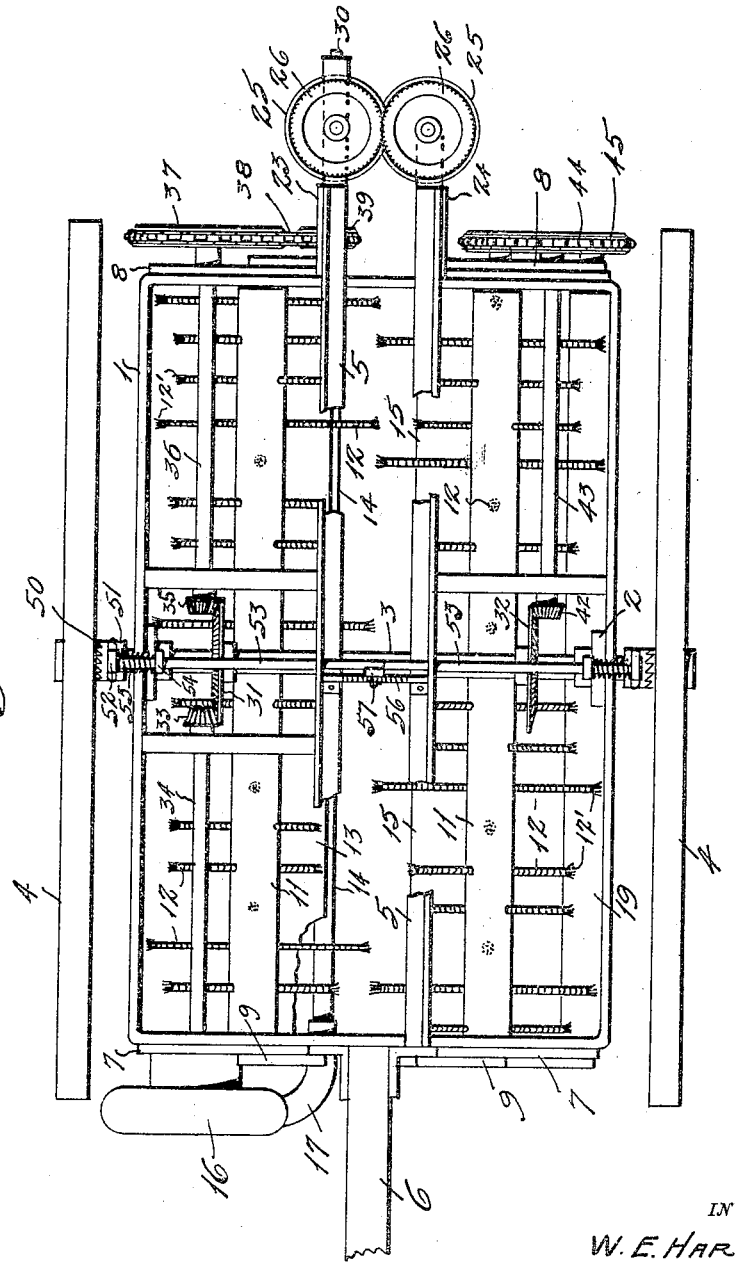
Fig. 2 is a plan view.

In the drawings the numeral 1 designates a substantially rectangular frame which is provided with depending bearing boxes 2 receiving an axle 3 on which ground wheels 4 are mounted so as to revolve the axle when the frame is moved forward. A pair of angle bars 5 are mounted on the frame and extend longitudinally from the front to the rear thereof on each side of the center. A tongue 6 is attached to the forward end of the frame. Hangers 7 are mounted on each side of the front end of the machine and like hangers 8 are mounted on the rear end of the machine, all depending from the frame.

Each hanger has a lateral bracket 9 which forms a bearing for a roller shaft 10. On each shaft is secured a cylindrical core 11 provided with radial arms 12. The shafts, cores and arms constitute agitating rollers or members of which two are provided, one on each side of the center of the machine. The arms 12 are preferably formed of coiled wire in the nature of elongated coiled springs as shown in detail in Figs. 4 and 6. These spring arms have sufficient rigidity to normally occupy radial positions, but are flexible enough to yield to even slight resistance, and have such resiliency as to vibrate vigorously when released after being displaced. While I have found coiled springs available and convenient, the invention is not limited to this detail. The arms give better results when made flexible, but rigid arms might be used. The agitators are positioned about midway between the frame and the ground and in juxta-position.

In the outer ends of the arms bristles 12' are mounted so as to form a brush on the end of each arm. The arms will thus brush the dead bolls, worms and insects from the plants. It is preferable to mount the arms in spiral order on the cores and as the agitators are revolved and the machine moved forward, the arms will have a spiral brushing action as well as vibratory motion.

At one side of the machine a sheet metal guard 13 is suspended from the frame. This guard extends from the front to the rear of the frame between the hangers on that side and forms a side wall and a bottom inclined toward the center of the machine. A perforated air blast pipe 14 is supported by the hangers 7 and 8 between which the guard 13 extends, said guard having its lower end on the pipe. The perforations of the pipe are disposed so as to direct a blast of air transversely of the machine and across the row of plants as the machine traverses the same. The hangers on the opposite side support a horizontal sheet metal bottom 15 which is spaced from the pipe to permit the stalks of the plants to pass therebetween and is at such an elevation that the falling bolls and bugs may be blown onto said bottom 15. On the front end of the frame a blower-fan 16 is mounted and connected with the pipe by a tube 17.

The outer edge of the bottom 15 is beveled downward toward the lower of a pair of crushing rollers 18 and 19 respectively and carries a scraper 20 which bears on the roller 18. The roller 18 is mounted in brackets 21 depending from the hangers, while the upper roller 19 is mounted in spring pressed blocks 22 slidable in said brackets. The rollers while held in contact will separate when a hard substance as a stone or stick is blown therebetween. The matter blown or deflected onto the bottom 15 is further carried by the blast of air to the rollers where it is crushed and delivered at the side of the machine and between the rows of plants. The eggs and live insects and bugs are thus crushed and destroyed.

The angle bars 5 are extended at the rear of the frame. One of the bars supports a bracket 23, while the other supports a bracket 24. On the brackets a pair of overlapping cutter-disks 25 are mounted and each is connected with a spur gear 26, said gears meshing. A bevel gear 27 is attached to one of the disks and is driven by another bevel gear 28 mounted on a shaft 30 supported in the bracket 23 and one of the rear hangers 8. The cutter-disks are revolved as the machine is drawn along the row of plants and any plants which have tops in the path of said disks, have their tops cut off.

For driving the various parts of the machine I mount two bevel gears 31 and 32, on the axle 3 one at each side of the frame. The gear 31 drives a bevel pinion 33 fixed on the forward end of a shaft 34 supported in the frame and extending forward to the blower-fan 16 which it drives. This same gear drives at its opposite side a bevel pinion 35 mounted on a rearwardly extending shaft 36 supported in the frame and having a sprocket wheel 37 fixed on its rear end. A sprocket chain 38 passes about said wheel 37 drives the shaft 30 and one of the agitators by passing about a sprocket 39 and a sprocket 41 and over an idler 40 interposed between the last two wheels. The other bevel gear on the axle drives a bevel pinion 42 fixed on a shaft 43 supported in the frame and having a sprocket 44 like the sprocket 37 on its rear end. A sprocket chain 45 passes over the wheel 44, a sprocket 46 on the shaft 10 of the under-lying agitator and around a sprocket 47 on the shaft of the lower roller 18. It will be seen that when the machine is drawn forward the axle 3 will be revolved in a forward direction so that the gears 31 and 32 will be likewise revolved. A clockwise revolution will be imparted to one agitator and counter clockwise revolution to the other, whereby the arms will be carried up through the plants and the agitators revolved in directions away from the plants. For throwing the revolving parts out of gear clutch mechanism is provided. Each wheel is provided with a clutch hub 50 which coöperates with a clutch sleeve 51 splined on the axle. Each sleeve is slid by a yoke 52 secured to the end of a transverse rod 53 having its outer end portion supported in a standard 54 projecting up from the frame. On each rod a coiled spring 55 is confined between the standard and the yoke, which tends to force the rod and yoke outward whereby the correlated sleeve is held in engagement with its clutch hub. A locking segment 56 is mounted transversely of the angle bars 5. A lever 57 is pivoted on the segment and one of the rods is pivoted to the lever below the pivot point of the latter, while the other rod is pivoted to said lever above its pivot point; thus a movement of the lever in one direction withdraws the sleeves from the clutch hubs and a movement in the other direction permits the springs to force the sleeves into engagement with the hubs.

In using the machine it is drawn along a row of plants so that the same pass between the agitators. It is proposed to work the machine while the plants are comparatively young. Where it is used for boll weevils it is taken to the field before the bolls are formed and before the squares or bolls have dropped off. When the weevils lay eggs they seal up the square and the latter soon begins to decay and falls to the ground. If the squares can be gathered before they fall off the eggs will be destroyed before they can hatch. Of course the machine can be used at any time during the growth of the plants although it is best to use it while the plants are young. As the machine traverses the row the agitators are revolved away from the plants so that the flexible spring arms are carried up through the plants and the dead squares, insects or worms brushed therefrom. Those falling onto the guard 13 slide down into the blast of air from the fan 16 and pipe 14 and are blown across onto the bottom 15. The dislodged matter from the other side falls onto the bottom 15 and all the dislodged matter is blown into the rollers 18 and 19 between it passed and crushed. The scraper 20 cleans the roller 18. The crushing of the squares mashes and destroys the eggs. All the crushed matter is delivered between the rollers and the adjacent ground and may be gathered, burned or left for fertilizer as desired.

The cutter-disks 25 are mounted at about the same level as the frame 1 and plants which had matured to this height would have their tops cut off, while lower plants would pass uncut. This arrangement keeps the plants at the desired height and prevents a "rank" growth. By cutting off the tops of high plants the rays of the sun are permitted to penetrate to the lower limbs of the plants and thus exterminate many insects which would otherwise thrive.

What I claim, is:

1. In a machine of the character described, a wheel supported frame having depending supporting members on each side of the longitudinal center of the machine and at each end of the machine, agitating members, one journaled in each supporting member, an air blast pipe disposed longitudinally at one side of the center and in the supporting members on said side of the frame, a guard having its lower end contiguous to the pipe, a horizontal bottom carried by the supporting members on the opposite side to the pipe, and a pair of crushing rollers mounted longitudinally of the frame in the supporting members carrying the bottom and contiguous to said bottom.

2. In a machine of the character described, a wheel supported frame, a horizontal platform on one side of the longitudinal center of the frame, an air blast pipe on the other side of said center, a revolving agitator disposed above the pipe and a revolving agitator disposed above the bottom, a guard extending down from one side of the frame to the blast pipe to intercept matter dislodged by the agitators and guide the same to the air blast from the pipe, whereby said matter is blown onto the bottom, and a pair of crushing rollers contiguous to the bottom.

In testimony whereof I affix my signature.

WILLIAM E. HARPER.

Copies of this patent may be obtained for five cents each, by addressing the "Commissioner of Patents, Washington, D. C."